United States Patent [19]

Araki et al.

[11] 4,269,227

[45] May 26, 1981

[54] VALVE APPARATUS

[75] Inventors: Tatsuo Araki, Tokyo; Yasuo Okamoto; Fumio Ohtomo, both of Yokohama; Hiroto Atsumi, Tokyo, all of Japan

[73] Assignee: Tokyo Shibaura Denki Kabushiki Kaisha, Tokyo, Japan

[21] Appl. No.: 969,700

[22] Filed: Dec. 14, 1978

[30] Foreign Application Priority Data

Dec. 21, 1977 [JP] Japan ................................. 52-152858

[51] Int. Cl.³ .............................................. F16K 1/12
[52] U.S. Cl. ................................. 137/630.14; 251/333
[58] Field of Search ..................... 137/630.14, 630.15; 251/333

[56] References Cited

U.S. PATENT DOCUMENTS

| | | | |
|---|---|---|---|
| 2,180,188 | 11/1939 | Ashworth | 137/630.14 |
| 2,333,455 | 11/1943 | Warren | 137/630.14 X |
| 3,424,431 | 1/1969 | Grose | 251/333 |
| 3,550,903 | 12/1970 | Hauser | 251/333 X |
| 3,773,085 | 11/1973 | Caldwell | 137/630.15 |

FOREIGN PATENT DOCUMENTS

| | | | |
|---|---|---|---|
| 33-31768 | 11/1958 | Japan | |
| 46-14487 | 4/1971 | Japan | 137/630.14 |
| 47-20891 | 4/1971 | Japan | |
| 1221185 | 2/1971 | United Kingdom | 251/333 |

OTHER PUBLICATIONS

AH CCCP Publication, No. 3, p. 168, 1964.

*Primary Examiner*—Robert G. Nilson

[57] ABSTRACT

A valve apparatus which comprises a main valve body and a main valve seat detachably abutting against each other to open and close a main fluid pass defined therebetween, and wherein, as measured from the longitudinal section of the valve apparatus, the detachably abutting plane of the main valve seat has a larger curvature radius than that of the main valve body in order to let a fluid stream conducted through the main fluid pass flow along the surface of the main valve seat; and that part of the surface of the main valve body defining one side of the main fluid pass with the main valve seat which faces the throat section of said main fluid pass is provided with a sharp edge at its end portion to allow for the easy removal of a main fluid stream from the main valve body.

4 Claims, 3 Drawing Figures

VALVE APPARATUS

BACKGROUND OF THE INVENTION

This invention relates to a valve apparatus for a fluid. Various known valve apparatuses of such type have the drawbacks that where a valve is slightly opened, an unstable region appears in which a valve body shakes; and where operated under such unstable condition, the valve apparatus starts shaking, which gives rise to noises and damages not only the valve seat and valve body put also the whole valve apparatus. To avoid the above-mentioned drawbacks, it has been proposed to apply a tough material to those parts of a valve apparatus which are ready to be damaged. However, such a valve still has the disadvantage of rendering a valve apparatus expensive due to the high cost of such tough materal.

FIG. 1 shows the valve body and valve seat of the prior art valve apparatus by way of illustrating its drawbacks. The valve apparatus of FIG. 1 is the type used for control of, for example, a steam turbine apparatus of a power plant. Reference numeral 10 denotes a main valve seat; 12 a hollow main valve body movable in the axial direction C—C of the main valve seat 10; 14 an auxiliary valve seat formed in the main valve body 12; and 16 an auxiliary valve body movable through the main valve body 12 in the axial direction C—C of the main valve seat 10. The auxiliary valve body 16 is formed integrally with the lower end of a valve rod 18. Now let it be assumed that a region above the main valve seat 10 (indicated by $P_1$) is supplied with a fluid (steam in this case) having pressure p1, and an opening $P_2$ bored in the main valve seat 10 in the axial direction C—C thereof is filled with steam having pressure p2. Where, under this condition, the valve rod 16 is moved downward of FIG. 1, the main valve body 12 contacts the main valve seat 10, and the auxiliary valve body 16 abuts against the auxiliary valve seat 14, then the valve apparatus is closed.

Where the valve rod 18 is pulled up under the above-mentioned condition, then the auxiliary valve body 16 is removed from the auxiliary valve seat 14 to provide an auxiliary fluid pass between said auxiliary valve body 16 and auxiliary valve seat 14. As a result, steam runs through said pass in the direction of the indicated arrows. This flow is thereinafter referred to as "a side stream". This side stream runs downward of FIG. 1 through an opening $P_2$ provided in the main valve seat 10. Where the valve rod 18 is further lifted under the above-mentioned condition, then, the main valve body 12 is pushed upward by the shoulder 16a of the auxiliary valve body 16 and leaves the main valve seat 10. As a result, a fluid pass (hereinafter referred to as "a main fluid pass" as against the auxiliary fluid pass) is produced between the main valve body 12 and main valve seat 10. Accordingly, a main stream is generated which runs obliquely downward of FIG. 1 through an opening $P_2$ provided in the main valve seat 10.

With the prior art valve apparatus, the main valve body 12 and main valve seat 10 are separated from each other with a small clearance. Where, therefore, the ratio of p2/p1 has a relatively small value, then the main stream flows symmetrically with respect to the axial line C—C of the main valve seat 10, as indicated by broken lines. A main stream indicating this flow pattern is referred to as "a main stream of a first flow mode". A further rise of the valve rod 18 increases an opening between the main valve body 12 and main valve seat 10 (hereinafter referred to as "a valve opening") and consequently the value of the ratio of p2/p1. As a result, the main stream may runs asymmetrically with respect to the axial line C—C as indicated by solid lines in FIG. 1, that is, in a second flow mode. Where the above-mentioned valve opening reaches a certain extent, then the main stream fluctuates between the first and second flow modes. As a result, the main valve body 12 vibrates relative to the main valve seat 10, and similarly the auxiliary valve body 16 shakes relative to the auxiliary valve seat 14. The above-mentioned event results in the harmful shaking of the prior art valve apparatus. This shaking gives rise to objectionable noises, mechanically damages the valve seats and valve bodies, and leads to variation in the pressure on the fluid outlet side of the valve apparatus. The aforesaid auxiliary valve body 16 and auxiliary valve seat 14 jointly constutute the known pilot valve positioned above the main valve body 12 and main valve seat 10 to allow for the easy separation of the main valve body 12 from the main valve seat 10.

SUMMARY OF THE INVENTION

It is accordingly the object of this invention to provide a valve apparatus which is free from drawbacks accompanying the prior art type and suppresses the vibration of the valve apparatus itself even when operated with the valve opening set at a small level.

To attain the above-mentioned object, this invention provides a valve apparatus which comprises a valve housing having a fluid inlet, a fluid outlet and a fluid pass extending therebetween; a main valve seat disposed intermediate the fluid pass of the valve body; and a main valve body detachably abutting agaist the main valve seat, thereby closing or opening a main fluid pass defined between said main valve body and main valve seat; and valve body-shifting means for moving said main valve body in the axial direction of the valve apparatus, and wherein the curvature radii $R_{40}$, $R_{42}$ of the main valve seat and main valve body abutting against each other have a relationship of $R_{40} > R_{42}$ as measured from the longitudinal cross section of the valve apparatus.

Where, with a valve apparatus constructed as described above, the main valve body is removed from the main valve seat to provide a main fluid pass therebetween, then a main stream is produced. This main stream flows along the surface of the main valve seat due to the Coanda effect, and its flow pattern does not fluctuate between the main valve body and main valve seat, regardless of the degree of the valve opening. Consequently, the main valve body is saved from vibrations. Freedom of the main valve body from vibrations prevents variations in fluid pressure on the outlet side of a valve apparatus, the occurrence of noises in the valve apparatus, and the damage which might otherwise take place, for example in the main body and main valve seat.

According to one preferred embodiment of this invention, the curvature radii $R_{40}$, $R_{42}$ of the main valve seat and main valve body are particularly chosen to have a relationship of $R_{40} > 2R_{42}$. Both radii $R_{40}$ and $R_{42}$ are positive in nature; that is, both form convex surfaces.

Another preferred embodiment of this invention comprises a pilot valve for easily removing the main valve body from the main valve seat. The main valve body can be removed from the main valve seat simply by driving the pilot valve with a small force, offering great convenience in operating a valve apparatus.

According to still another preferred embodiment of the invention, the curvature radii $R_{40}$, $R_{42}$ of the main valve seat and main valve body are similarly chosen to have the aforesaid relationship. Further, the down stream end of the throat section of the main fluid pass defined by the main valve body with the main valve seat is provided with a sharp edge in order to allow for the easy removal from the main valve body of a main stream flowing through the main fluid pass. The surface of the main valve body is so sharply bent as to depart from the main stream. The above-mentioned construction of the main valve body enables the main stream to be easily removed from the main valve body, and reliably run away along the surface of the main valve seat.

DETAILED DESCRIPTION OF THE PREFERRED EMBODIMENTS

Figure 1:
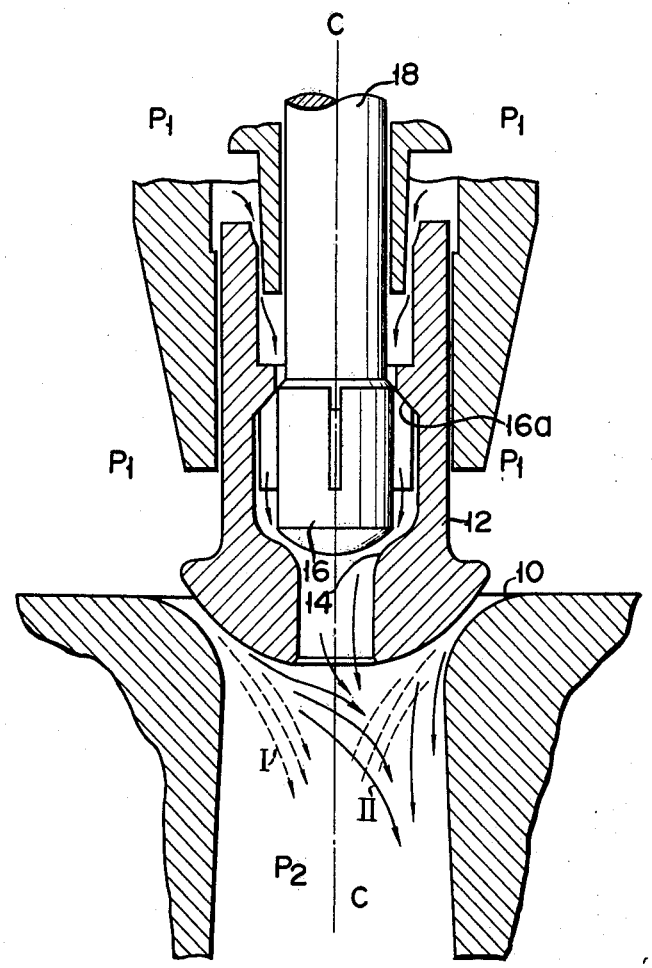
FIG. 1 is a longitudinal sectional view of the prior art valve bodys and valve seats.
Figure 2:
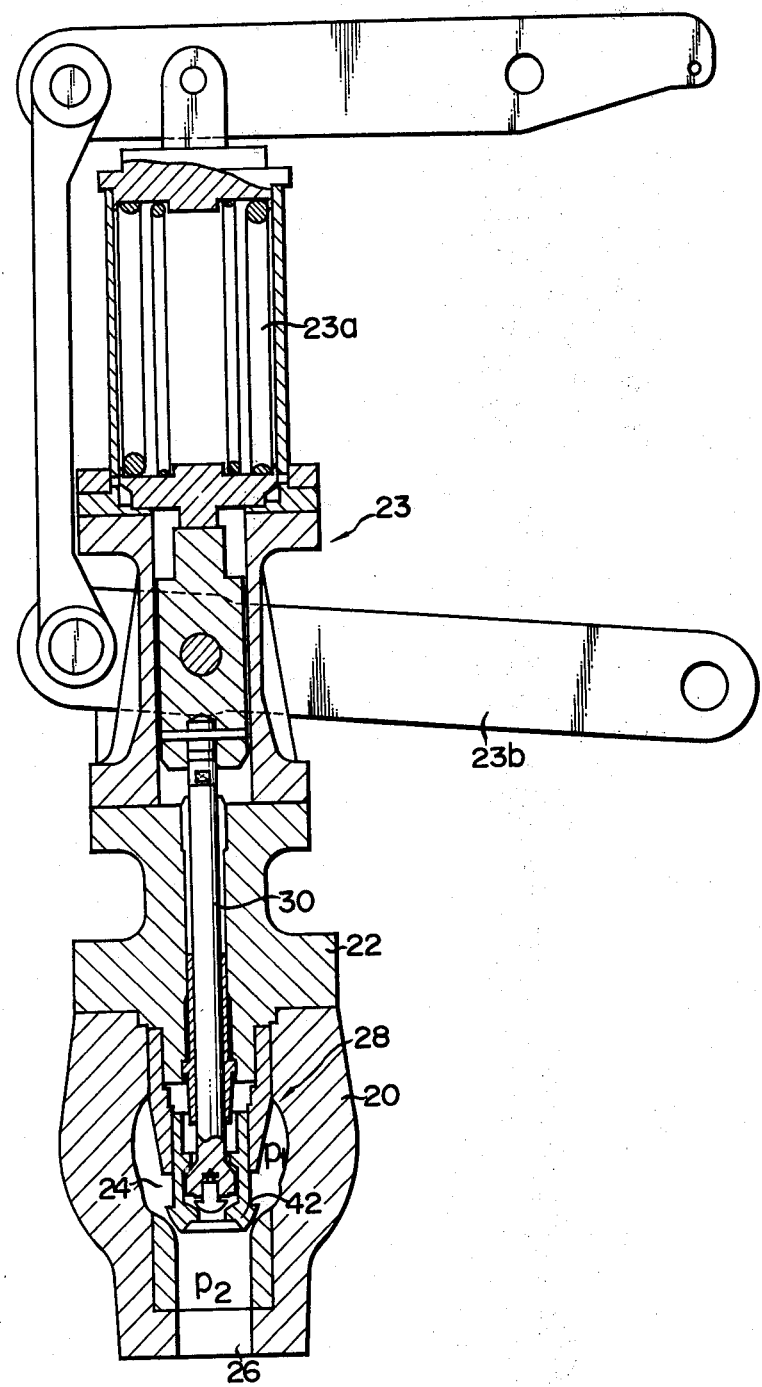
FIG. 2 is a longitudinal sectional view of a valve apparatus embodying this invention.

FIG. 2 illustrates a valve apparatus embodying this invention used to control the flow of steam. Reference numeral 20 shows a valve housing. 22 denotes a lid mounted on the valve housing 20. A valve rod-driving device 23 is provided on the lid 22. This valve rod-driving device 23 is unrelated to this invention, and already known, description thereof being omitted. Reference numeral 23a is a spring for pushing a valve rod 30 used to close a valve apparatus. 23b is a crank for opening the valve apparatus. 24, 26 are a fluid inlet and a fluid outlet provided for the valve body 20. Though actually set an the backside of the valve housing 20, the fluid inlet 24 is indicated for convenience sake in a space surrounding the later described main valve body 42. Reference numeral 28 is a valve section for opening and closing a fluid passage formed in the valve housing 20 for communication between the fluid inlet 24 and fluid outlet 26. Reference numeral 30 is a valve rod operated by the aforesaid valve rod-driving device 23 to open and close the valve section 28.

Figure 3:
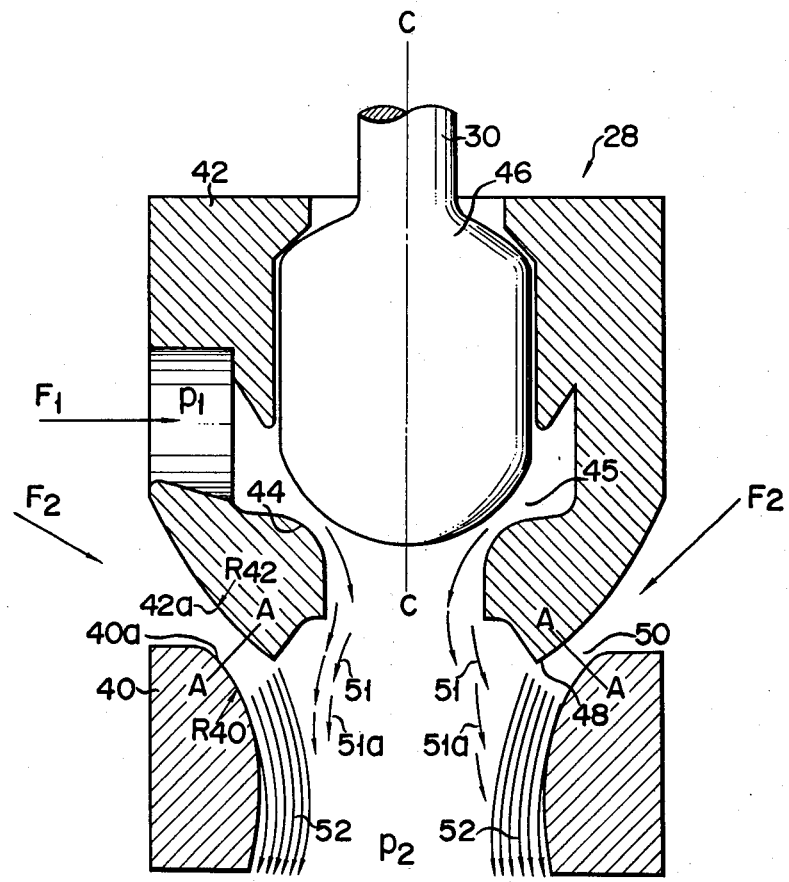
FIG. 3 is an enlarged view of the main valve body, main valve seat, auxiliary valve body and auxiliary valve seat of the valve apparatus of FIG. 2 embodying this invention.

FIG. 3 is an enlarged view of the valve section 28 for illustrating its construction and operation. It will be noted that FIG. 3 schematically shows said valve section 28 simply by way of illustrating its operation. Reference numeral 40 is a main valve seat. 42 is a hollow main valve body, which is movable in the axial direction C—C of the main valve seat 40. When the main valve body 42 is removed from the main valve seat 40, a main fluid passes 50 through which steam flow is produced between the main valve body 42 and main valve seat 40. Reference numeral 44 is an auxiliary valve seat formed on the inner wall of the main valve body 42. 46 is an auxiliary valve body received in the main valve body 42 to be moved in the axial direction C—C. The auxiliary valve body 46 is formed integrally with the lower and of a valve rod 30. The main valve seat 40, main valve body 42, auxiliary valve seat 44, auxiliary valve body 46 and valve rod 30 jointly constitute the valve section 28 of the present valve apparatus. Reference numeral p1 shows pressure on the fluid inlet side, and p2 denotes pressure on the fluid outlet side.

Unlike the prior art type, the valve apparatus embodying this invention has two distinct features.

(1) The detachably contacting portions 42a, 40a of the main valve body 42 and main valve seat 40 which abut against each other when the valve apparatus is closed have curvature radii $R_{42}$, $R_{40}$ which are chosen to have a relationship of $R_{40} > R_{42}$.

(2) The surface of the main valve body 42, which is formed on the down stream side of the throat section (indicated by a line A—A), is bent away from the main fluid pass 50 forming a sharp edge 48. The throat section of the main fluid pass 50 is produced when the valve section 28 is opened between the main valve body 42 and main valve seat 40.

Where, with a valve apparatus embodying this invention which is constructed as described above, the valve rod is raised by operating a handle 23b, then the auxiliary valve body 46 departs from the auxiliary valve seat 44 to provide an auxiliary fluid pass 45 therebetween. Steam is supplied to the valve apparatus in the direction of an arrow $F_1$ (FIG. 3). The steam flows through the auxiliary fluid pass 45 and an opening formed in the auxiliary valve seat 44 toward an opening formed in the main valve seat 40. The auxiliary valve body 46 abuts against the main valve body 42 with a proper degree of clearance in the axial direction C—C. Therefore, the main valve body 42 is not moved by merely opening the auxiliary fluid pass 45.

Where the valve rod 30 is further pulled up to remove the main valve body 42 from the main valve seat 40 and provide the main fluid pass 50, then steam runs through the auxililary fluid pass 45 and also the main fluid pass 50 in the direction of an arrow $F_2$ and flows downward through the central opening of the main valve seat 40 in the direction of a main stream indicated by the arrow 52. In this case, steam does not flow along the surface of the main valve body 42, but along the surface of the main valve seat 40 having a larger curvature radius $R_{40}$. Thus, the auxiliary valve body 46 is first removed from the auxiliary valve seat 44, and then the main valve body 42 departs from the main valve seat 40. The reason is that it is intended to reduce a difference between the pressure p1 on the fluid inlet side where the main valve body 42 is pressed against the main valve seat 40 and the pressure p2 on the fluid outlet side by generating an auxiliary stream due to the lifting the auxiliary valve body 46 received in the main valve body 42 with a relatively small force, thereby making it possible to remove the main valve body 42 from the main valve seat 40 easily with a relatively small force. In other words, the auxiliary valve body 46 and auxiliary valve seat 44 jointly act as the so-called pilot valve to remove the main valve body 42 from the main valve seat 40.

As mentioned above, a steam stream passes along the surface of the main valve seat 40 having a larger curvature radius $R_{40}$. This event arises due to the so-called Coanda effect that where a fluid runs through a pass defined between, for example, two planes having different curvature radii, then the fluid flows along the surface of the plane having the larger curvature radius.

The aforesaid sharp edge 48 on the main valve body 42 enables a steam stream running through the main fluid pass 50 to easily leave the main valve body 42 and flow downward.

A valve apparatus according to the foregoing embodiment which is provided with the previously described first and second features has the advantage that even where the ratio of the fluid inlet pressure p1 to the fluid outlet pressure p2 is varied, a steam stream traveling through the main fluid pass 50 always runs along the surface of the main valve seat 40 having a larger curvature radius $R_{40}$ in the direction of the main stream 52; an auxiliary steam stream conducted through the auxiliary fluid pass 45 flows in the direction of the indicated arrows 51, 51a after leaving the auxiliary valve seat 44, and run down by being sucked into a main stream 52; and consequently all these steam streams always maintain a fixed flow pattern mainly due to the previously described Coanda effect.

With a valve apparatus embodying this invention, steam streams running therethrough indicate substantially the same stable flow pattern as described above in any longitudinal sectional area. Even where, therefore, the valve apparatus is operated at a small valve opening, a steam stream does not indicate any unstable flow, thereby eliminating the drawbacks accompanying the prior art valve apparatus that where, for example, a steam stream runs irregularly, the main and auxiliary valve bodies vibrate.

To attain the above-mentioned effect featuring this invention, it is advised that the curvature radii $R_{40}$, $R_{42}$ of the main valve seat 40 and main valve body 42 be made to have a relationship of $R_{40} > R_{42}$. Where, however, both curvature radii are particularly chosen to have a relationship of $R_{40} > 2R_{42}$, then it is possible to elevate the advantageous effect of the invention.

What we claim is:

1. A valve apparatus comprising:
   a valve housing having a fluid path therein;
   a main valve seat provided at an intermediate position of said fluid path and having a circular through hole in which an inner curvilinear line obtained when the inner circumferential curved surface of the seat defining said through hole is cut at a longitudinal cross-section including the central axis of said through hole, is convex toward said central axis and has an arcuate curvilinear line portion with a radius;
   a main valve body having a valve seat side adapted to be moved forwardly along said central axis relative to said main valve seat and into contact with the seat to close said fluid path and having a first portion formed at the forward end portion of the valve seat side of the valve body such that it is coaxial with said through hole, said first portion being entirely comprised by a convex, outer peripheral curved surface for closing said fluid path, and a second portion having a conical surface at that forward portion of the valve seat side merging with said convex surface of said first portion, a sharp edge portion being formed between said convex surface of said first portion and said second portion, the apex of said conical surface being rearward of said sharp edge, in which an outer peripheral curvilinear line of said first portion obtained when said first portion is cut at said longitudinal cross-section has an arcuately curved line with a radius smaller than that of said valve seat; and
   means for moving said main valve body into engagement, and out of engagement with said main valve seat.

2. The valve apparatus according to claim 1, which further comprises a pilot valve allowing for the easy removal of the main valve body from the main valve seat.

3. The valve apparatus according to claim 2, wherein the main valve body is made hollow, and the pilot valve comprises an auxiliary valve seat formed on an innerwall of the main valve body; an auxiliary valve body moved detachably abutting against the auxiliary valve seat in the axial direction of the main valve seat so as to open and close a fluid pass defined between the auxiliary valve body and auxiliary valve seat; and a connecting means for connecting the valve shifting means to the auxiliary valve body with a prescribed clearance.

4. The valve apparatus according to claim 1, wherein the curvature radii $R_{40}$, $R_{42}$ of the main valve seat and main valve body have a relationship of $R_{40} > 2R_{42}$.

* * * * *